Patented Feb. 6, 1945

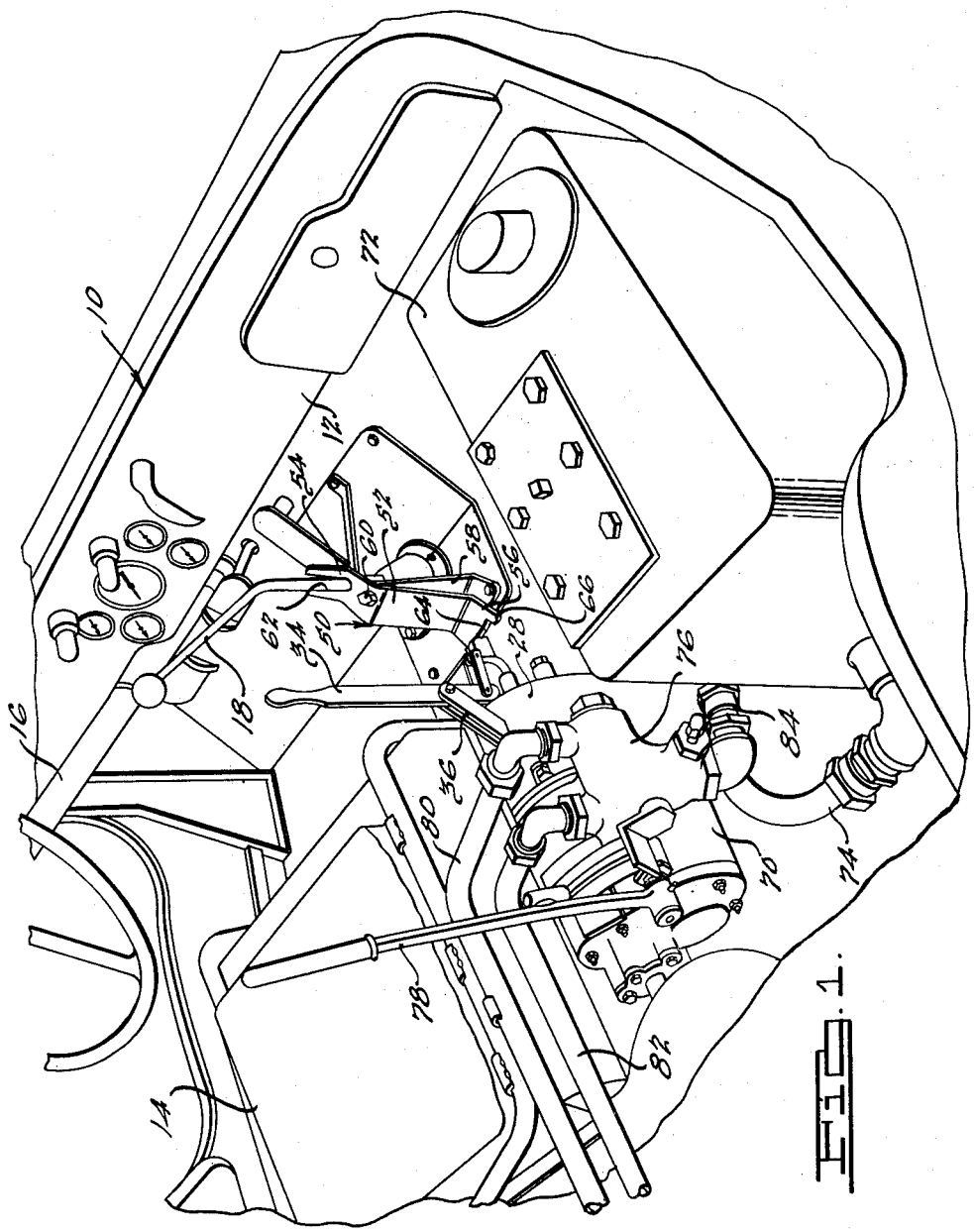

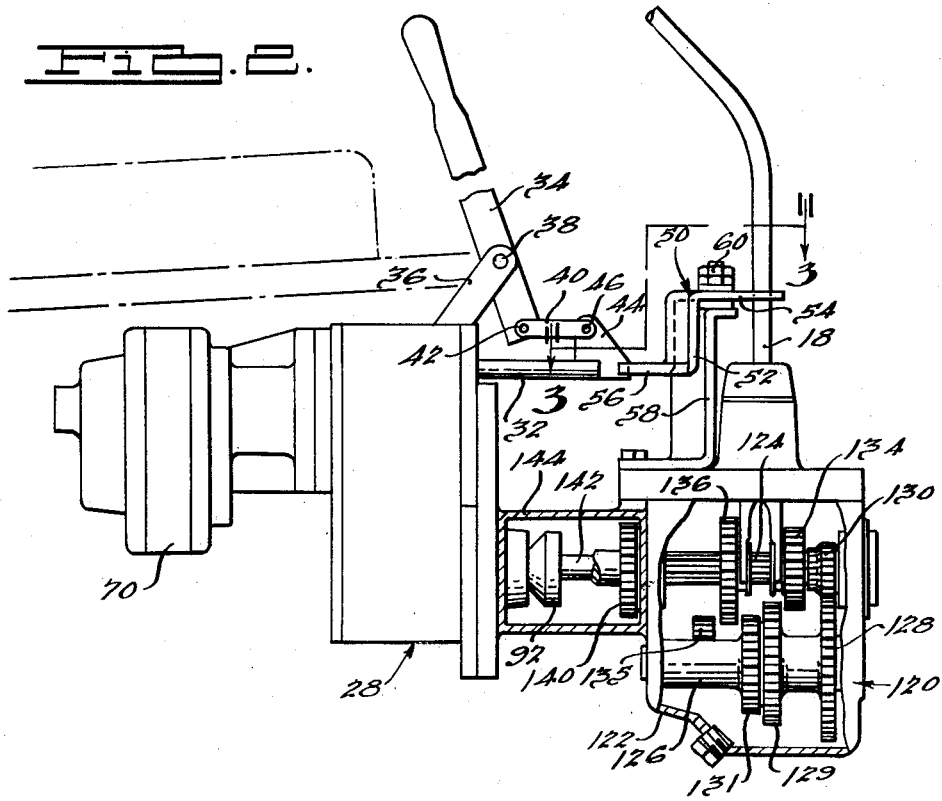

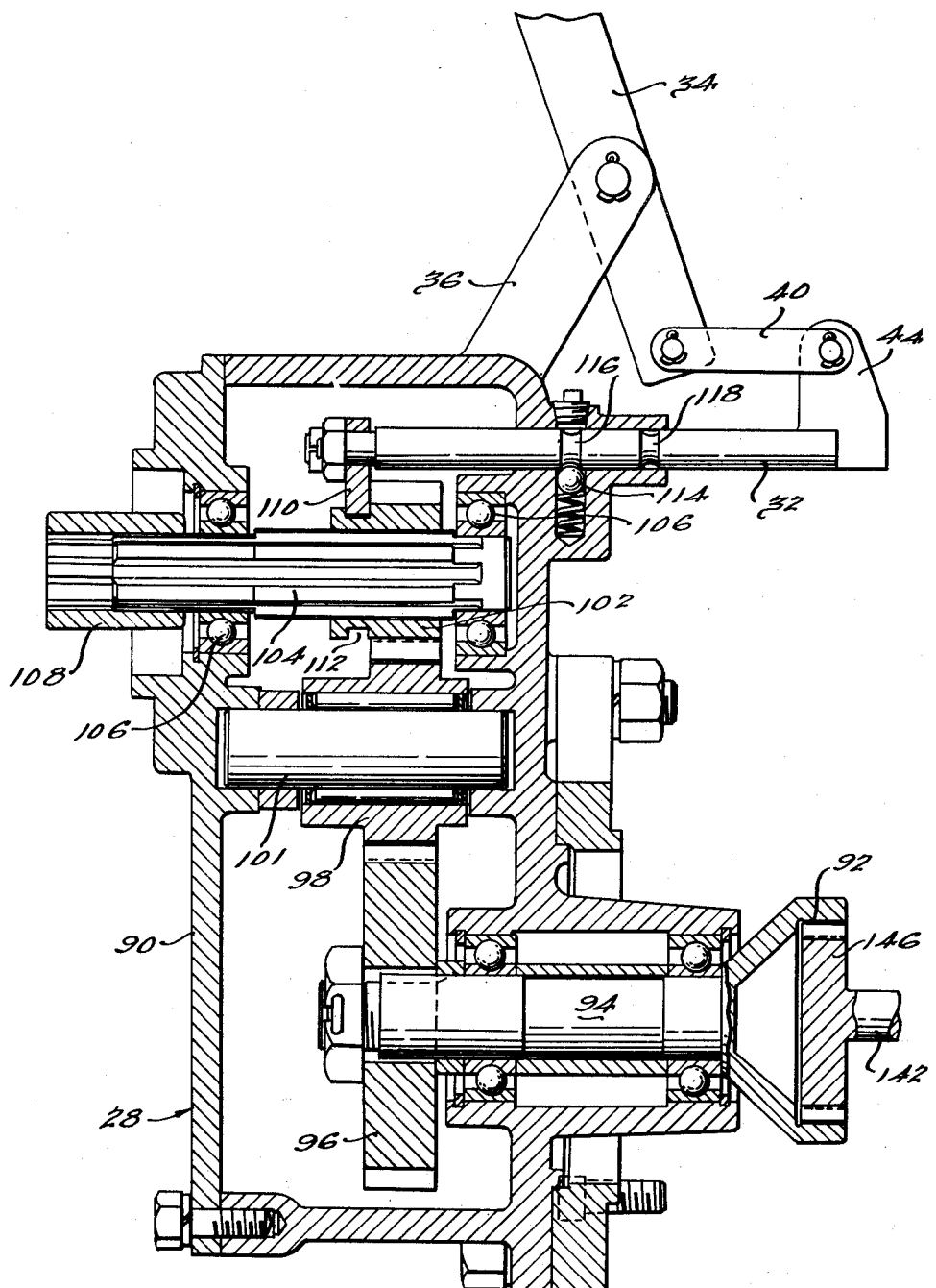

2,369,078

UNITED STATES PATENT OFFICE 2,369,078

POWER TAKE-OFF LOCKOUT MECHANISM

George D. Shaeffer, Detroit, Mich., assignor to Gar Wood Industries, Inc., Detroit, Mich., a corporation of Michigan Application February 27, 1943, Serial No. 477,393

4 Claims. (Cl. 74—483)

The present invention relates to a lock-out mechanism for a power take-off on a vehicle.

One of the primary objects of the present invention is to provide a lock-out mechanism for a power take-off on a vehicle where such lock-out mechanism is associated with the vehicle gear shift lever and is movable therewith so that the power take-off cannot be thrown in except in a selected position of the gear shift lever.

A further object of the invention is to provide a lock-out mechanism of the type mentioned which is so constructed and associated with the gear shift lever that the power take-off can only be thrown in when the gear shift lever is in first or low speed position.

A more specific object of the present invention is to provide a lock-out mechanism between an hydraulic pump and a variable speed transmission so that the pump can only be operated at low speed, thereby preventing its burning out at the higher speeds and cannot be rotated in a reverse rotation.

Other objects of the invention will become apparent from the following description, from the drawings forming a part of the specification, and from the claims hereinafter set forth.

For a better understanding of the invention, reference may be had to the drawings, wherein:

Figure 1 is a partial perspective view of the interior of an automotive vehicle showing the lock-out mechanism of the present invention associated with the power take-off and a power unit, such as an hydraulic pump;

Figure 2 is a fragmentary, side elevational view of a portion of the structure shown in Figure 1;

Figure 3 is a top plan view taken substantially along the line 3—3 of Figure 2;

Figure 4 is a view similar to Figure 3 showing the lock-out mechanism in a different position; and Figure 5 is a vertical cross-sectional view of the power take-off employed with the structure of the present invention.

Referring to the drawings, an automotive vehicle is generally indicated at 10 and such vehicle has the usual motor mounted under the hood forwardly of the dashboard 12. The vehicle 10 includes an operator's seat 14 located behind the steering column 16 and to one side of the conventional gear shift lever 18. Such gear shift lever is shown in Figure 3 as in its neutral position and is movable to positions 20, 22, 24, and 26, which represent positions of such lever when the gears are in first, second, third, and reverse, respectively.

A power take-off mechanism, generally indicated at 28, is provided which includes a housing 90 having a removable end plate within which the transfer gears are mounted. Such gears include an internal gear 92 adapted to be connected to a variable speed transmission in a manner to be described in detail hereinafter. Such gear 92 is connected to a shaft 94 which is mounted within suitable bearings within a bore provided in the housing 90. An external gear 96 is disposed within the housing and is connected with the opposite end of the shaft 94, to be driven thereby. The gear 96 meshes with an idler gear 98 which is rotatably mounted on a shaft 101. Such shaft 101 is mounted within aligned trunnions provided in the housing 90. The gears 96 and 98 are in constant mesh and the gear 98 is adapted to mesh with a gear 102 which is splined to a spline shaft 104. The spline shaft 104 is mounted within suitable bearings 106 which are in turn mounted within the housing 90, and one end of the shaft 104 projects outwardly of the housing and has a coupling 108 connected thereto which is adapted to be connected to the drive shaft of a power element, such as an hydraulic pump.

By shifting the gear 102 along the shaft 104, the gear 102 may be thrown in or out of mesh with the gear 98 to drive the shaft 104 or to have it remain idle. The gear 102 is shifted by a movable actuating element 32 which is connected to the gear 102 by means of a yoke arm 110 which is mounted on the inner end of element 32. The prong of such arm is received within an annular groove 112 formed integral with the gear 102 which projects outwardly of the housing of the power take-off. When such element 32 is moved to the right, viewing Figure 2, the power take-off is thrown in; and when the element 32 is moved to the left, viewing Figure 2, the power take-off is thrown out. The element 32 may be held in either of its positions by means of a spring pressed detent 114 which engages within either one of longitudinally spaced grooves 116 or 118.

In order to shift the movable member 32, a lever 34 is pivotally mounted to a bracket 36 by means of a pivot pin 38 in a position adjacent the side of the seat 14. The lower end of the lever 34 has a link 40 pivotally connected thereto by means of a pivot pin 42 and the forward end of such link 40 is pivotally connected to a plate member 44 by means of a pivot pin 46.

The plate member 44 is fixedly secured to the forward end of the actuating element 32. Thus, when the upper end of the lever 34 is moved forwardly, the plate 44 is moved rearwardly to throw the power take-off out, and when the upper end of the lever 34 is pulled rearwardly the power take-off is thrown in.

According to the present invention, lock-out mechanism generally indicated at 50 is associated with the actuating element 32 and the gear shift lever 18 so that the power take-off can only be thrown in when the gear shift lever 18 is in first or low gear. Such lock-out mechanism 50 includes a plate member 52 which is bent substantially at right angles to provide an upper substantially horizontal portion 54 and a lower substantially horizontal portion 56. The portion 54 is pivotally connected to an upstanding bracket 58 mounted on the vehicle floor adjacent the gear shift lever by means of a pivot pin 60.

The portion 54 is formed with a slot 62 in the end thereof which is adapted to embrace the gear shift lever 18 so that such lever slidably engages the sides of the slot as it is shifted to its various positions. The portion 56 is formed with a stop edge 64 having a limit stop projection 66 at one end thereof and such stop edge is so constructed that as the member 52 is pivoted about pivot 60 when the gear shift lever 18 is shifted, the edge 64 is positioned to block movement toward the right, viewing Figure 2, of actuating element 32 for certain positions of the gear shift lever. In particular, the movement of the actuating element 32 will be blocked when the gear shift lever 18 is in its neutral position or moved to positions 22, 24, and 26, as shown in Figure 3. However, when the gear shift lever 18 is moved to position 20, which is the first or low gear position of the gear shift lever, the plate 52 is pivoted so that the edge 64 is moved out of blocking position with respect to the actuating element 32 so that it may be moved to the right, viewing Figure 2, as shown in Figure 4. As stated above, in this position the power take-off is then thrown in so that power may then be transmitted through the take-off 28 to suitable operating elements. In this position it may be stated also that the gear shift lever 18 is in a locked position and cannot be shifted until after lever 34 has been returned to its former position.

In the embodiment illustrated, the power take-off 28 is operatively connected to and adapted to drive a conventional hydraulic gear pump 70. The hydraulic fluid, preferably oil, is supplied to the pump from a tank or reservoir 72 through an inlet conduit 74 associated with the inlet of the pump 70. The pressure outlet from the pump 70 leads to the inlet of a conventional four-way spool valve 76. The spool of the valve 76 is shifted to its various positions by means of an operating lever 78 and when in one position the fluid under pressure passes from the valve 76 through conduit 80 and returns through conduit 82. Another conduit 84 is associated with the valve to return the fluid to the tank 72. The conduits 80 and 82 may be operatively connected to hydraulic jacks for the purpose of operating bulldozer or scraper elements as may be desired. The stop mechanism of the present invention has particular utility when combined with an hydraulic pump and power take-off because of the danger of burning out the pump if it were operated at high speed. With the present structure the pump can only be operated at low speed.

The power take-off 28 receives its power from a variable speed transmission, generally indicated at 120. Such transmission 120 may be of any of the conventional types with three speeds forward and reverse, or four speeds forward and reverse, for example, or any of the conventional types. In the embodiment illustrated, it is shown of the type three speeds forward and reverse and comprises a housing 122 having a splined, main shaft 124 therein which is connected to the crank shaft in the usual manner. A countershaft is mounted within the housing having gears 128, 129 and 131 mounted thereon. A driving gear 130 is constantly driven from the crank-shaft and is in constant mesh with gear 128 on the countershaft. Combined gear and clutch member 134 is mounted on shaft 124, and when shifted toward gear 130 is in direct mesh therewith for driving at high speed. When gear 134 is shifted to mesh with gear 129 the drive is in second or intermediate speed. Gear 136 is mounted on the spline shaft, and when shifted to mesh with gear 131 the drive is in first or low speed. The usual idler gear 135 is mounted within the housing 122 behind the counter-shaft and is constantly driven by gear 131. When gear 136 is shifted to mesh with idler 135 the drive is in reverse. The transmission structure is conventional, as mentioned above, and is shown here merely for the purpose of illustration in that a variable speed transmission has particular significance in the combination here disclosed.

The shaft 124 projects rearwardly out of the housing 122 and is adapted to be connected to the propeller shaft in the usual way. The power take-off 28 is transversely offset with respect to the propeller shaft so there will be no interference with it. In order to transfer the drive from shaft 124 to the power take-off 128, a gear 140 is keyed to the outwardly projecting end of the shaft 124 and is adapted to mesh with another gear mounted on the shaft 142. The shaft 142 and gear which meshes with gear 140 may all be enclosed within a suitable gear box 144. The shaft 142 has an external gear 146 secured to or formed integral with the end thereof which is adapted to be received within and mesh with the internal gear 92 of the power take-off.

While the transmission may operate at various speeds, including forward and reverse, and while such speeds and direction of speeds are transmittted directly to the power take-off, it will be understood from the above that the gear 102 can only mesh with the gear 98 when the transmission is shifted to its low or first speed.

According to the above, a construction is provided whereby the pump 70 may be operated only when the gear shift lever 18 is in first or low gear.

What is claimed is:

1. A lock-out mechanism for a power take-off on a vehicle having a gear shift lever movable to any one of a plurality of positions, and in which said power take-off has a movable actuating element, comprising a pivoted stop element, means pivotally mounting said stop element, said stop element having an elongated slot adapted to embrace said lever so that when said lever is moved to any of said positions said stop element is correspondingly pivoted and a stop portion on said stop element so constructed as to block the movement of said actuating element in certain positions of said lever and to permit the movement of said actuating element in a particular one position of said lever.

2. A lock-out mechanism for a power take-off on a vehicle having a gear shift lever movable to any one of a plurality of positions, and in which said power take-off has a movable actuating element, comprising a pivoted stop element, means pivotally mounting said stop element intermediate the ends thereof, said stop element having an elongated slot formed in one end thereof adapted to embrace said lever so that when said lever is moved to any of said positions said stop element is correspondingly pivoted, and a stop portion on the opposite end of said stop element so constructed as to block the movement of said actuating element in certain positions of said lever and to permit the movement of said actuating element in a particular one position of said lever.

3. A lock-out mechanism for a power take-off on a vehicle having a gear shift lever movable to first, second, third and reverse positions, and in which said power take-off has a movable actuating element, comprising a pivoted stop element, means pivotally mounting said stop element, said stop element having an elongated slot adapted to embrace said lever so that when said lever is moved to any of said positions said stop element is correspondingly pivoted, and a stop portion on said stop element so constructed as to block the movement of said actuating element in said second, third and reverse positions of said lever and to permit the movement of said actuating element in said first position of said lever.

4. A lock-out mechanism for a power take-off on a vehicle having a gear shift lever movable to any one of a plurality of positions, and in which said power take-off has a movable actuating element, comprising a pivoted stop element, means pivotally mounting said stop element, said stop element being connectable with said lever so that when said lever is moved to any of said positions said stop element is correspondingly pivoted and a stop portion on said stop element so constructed as to block the movement of said actuating element in every position of said lever except one, said actuating element being disposed against a portion of said stop element when in said one position to prevent pivoting of said stop element until said actuating element is released, is thereby preventing shifting of said gear shift lever until said actuating element is moved to its released position.

GEORGE D. SHAEFFER.